United States Patent
Yamaguchi et al.

(10) Patent No.: US 6,480,251 B1
(45) Date of Patent: Nov. 12, 2002

(54) REFLECTION LIQUID CRYSTAL DISPLAY ELEMENT

(75) Inventors: Hisanori Yamaguchi, Ishikawa (JP); Tomoaki Sekime, Ishikawa (JP); Yoshio Iwai, Ishikawa (JP); Tetsu Ogawa, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,099

(22) PCT Filed: May 27, 1999

(86) PCT No.: PCT/JP99/02827

§ 371 (c)(1),
(2), (4) Date: Jan. 23, 2001

(87) PCT Pub. No.: WO99/61952

PCT Pub. Date: Dec. 2, 1999

(30) Foreign Application Priority Data

May 28, 1998 (JP) ............................................. 10-146780

(51) Int. Cl.[7] ............................................. G02F 1/1335
(52) U.S. Cl. ........................ 349/119; 349/113; 349/117; 349/118
(58) Field of Search ................................ 349/113, 115, 349/117, 118, 119

(56) References Cited

FOREIGN PATENT DOCUMENTS

| JP | 7-333435 | 12/1995 |
| JP | 9043596 | 2/1997 |
| JP | 9-258213 | 10/1997 |

*Primary Examiner*—Toan Ton
*Assistant Examiner*—Hoan Nguyen
(74) *Attorney, Agent, or Firm*—RatnerPrestia

(57) ABSTRACT

In a reflective liquid crystal display device with a single polarizing film and two retardation films located in between the polarizing film and liquid crystal cell, the angle of twist of nematic liquid crystal is 45°~90°, the product of the birefringence of the liquid crystal and the thickness of the liquid crystal layer is 0.20 $\mu$m~0.30 $\mu$m, the retardation value of the retardation film on the polarizing film side is 0.13 $\mu$m~0.18 $\mu$m, the retardation value of the retardation film on the liquid crystal cell side is 0.13 $\mu$m~0.18 $\mu$m, and the Z coefficient of each of two retardation films is 0.3~1.0. This invention is featured by the following optical relations, that is, $\emptyset_P$ 75°~195°, $\emptyset_P - \emptyset_{F1}$, 105°~115°, and $\emptyset_P - \emptyset_{F2}$, 165°~175°, where $\emptyset_P$, $\emptyset_{F1}$ and $\emptyset_{F2}$ are angles formed by the reference line and respectively the direction of the absorption axis of the polarizing film, the direction of the slow axis of the retardation film on the polarizing film side, and the direction of the slow axis of the retardation film on the liquid crystal cell side. With the foregoing construction, a high contrast display of bright achromatic white and achromatic black is achieved.

20 Claims, 6 Drawing Sheets

REFLECTION LIQUID CRYSTAL DISPLAY ELEMENT

TECHNICAL FIELD

The present invention relates to a reflective liquid crystal display device with a reflection electrode.

BACKGROUND OF THE INVENTION

Liquid crystal display devices (LCD) are thin and light thus have been used for a wide range of purposes such as a display for a mobile information terminal. LCDs do not emit light themselves. They are a light-receiving-type device which displays an image by changing the level of transmittance of light. LCDs can be driven by effective voltage of several volts. Therefore, if LCD is used as a reflective-type by disposing a reflecting plate under the LCD to utilize reflection of external light, no electricity is required for a back light, thus the display device becomes extremely efficient in terms of power consumption.

A conventional reflective color LCD comprises a liquid crystal cell including color filters, and a pair of polarizing films which sandwich the liquid crystal cell. The color filters are disposed on one of substrates of the liquid crystal cell. On top of the color filters disposed on the substrate is a transparent electrode. By applying voltage on the liquid crystal cell, orientation of the liquid crystal molecules is changed, thereby controlling the transmittance of light of each color filter to display a color image.

The transmittance of a polarizing film is only about 45% at the maximum. The transmittance of the polarized light parallel to the absorption axis of the polarizing film is approximately 0% while that of the polarized light perpendicular to the absorption axis of the polarizing film is 90%. In the case of the reflective LCD using two polarizing films, light goes through polarizing films four times before emitted. Therefore, the maximum reflectance can be defined as:

$$(0.9)^4 \times 50\% = 32.8\%$$

when absorption by other materials such as a color filter is not considered.

Thus, even the reflectance of a black and white display panel which does not use color filters is only about 33%. If color filters are applied to such a device to display a color image, the reflectance will be reduced to about one third of the original reflectance, inhibiting the achievement of a reflectance high enough for a sufficient luminance.

To brighten the display, several constructions have been proposed, for example, by the Japanese Patent Application Unexamined Publications No. H07-146469 and No. H07-84252, in which only one polarizing film is used on top of the liquid crystal cell, which is sandwiched between the polarizing film and a reflecting plate. In this case, light goes through the polarizing film only twice, thus the maximum reflectance can be defined as:

$$(0.9)^2 \times 50\% = 40.5\%$$

when absorption by other materials such as the color filters is not considered.

Therefore, in this case, a maximum increase of 23.5% in reflectance from the construction using two polarizing films can be expected.

However, with this reflective LCD with one polarizing film, when displaying a color image by using color filters while trying to obtain higher luminance by increasing the reflectance, color drift often occurs, obstructing a clear achromatic display. In particular, an achromatic black has been difficult to display.

The Japanese Patent Application Unexamined Publication No. H06-308481 has disclosed a reflective color LCD which displays a colored image without color filters by utilizing birefringence of the twisted nematic liquid crystal layer and polarizing films. The Japanese Patent Application Unexamined Publications No. H06-175125 and No. H06-301006 have disclosed a color LCD which utilizes birefringence of a liquid crystal layer and phase retardation films. Since these LCD do not use color filters, a reflectance high enough to achieve practical luminance is ensured even when two polarizing films are used. However, in the case of the foregoing devices, since a colored image is displayed based on coloring by birefringence, multi-gradation, multi-color displays such as 16 gradation, 4096 color display and 64 gradation full-color display have principally been difficult. Moreover, the color purity and the color reproduction range have been limited.

Considering the aforementioned issues, the present invention aims at providing a reflective LCD that achieves a bright white display and a high contrast, and is capable of displaying achromatic black and white as well as multi-gradation and multi-color displays.

SUMMARY OF THE INVENTION

To achieve the foregoing purpose, the present invention has the following construction.

The reflective liquid crystal display device of a first construction of the present invention comprises the following elements;

a) a liquid crystal cell formed of a nematic liquid crystal injected between a first and a second substrates;

b) a polarizing film disposed on the first substrate of the liquid crystal cell;

c) two retardation films disposed in between the polarizing film and the liquid crystal cell; and d) a light reflecting means disposed on the second substrate. The twist angle of the nematic liquid crystal $\Delta_{LC}$ is 45°~90°. The product of the birefringence of the nematic liquid crystal $\Delta n_{LC}$ and the thickness of the liquid crystal layer $d_{LC}$, namely $\Delta n_{LC} \cdot d_{LC}$ is 0.20 µm~0.3 µm. The retardation value of the retardation film on the polarizing film side $R_{F1}$ is 0.23 µm~0.28 µm. The retardation value of the retardation film on the liquid crystal cell side $R_{F2}$ is 0.13 µm~0.18 µm. The Z coefficient $Q_Z$ of each retardation film is 0.3~1.0. When bisector of the larger of the angle formed by the orientation direction of the liquid crystal molecules closest to one of the substrates and the orientation direction of the liquid crystal molecules closest to the other substrate, is set as a reference line in the substrate, and when the direction in which the nematic liquid crystal is twisted from the first substrate to the second substrate, viewed from the side of the first substrate, is defined positive, the present invention is featured by $\emptyset_P$ is 75°~195°, $\emptyset_P - \emptyset_{F1}$, 105°~115°, and $\emptyset_P - \emptyset_{F2}$, 165°~175°, where an angle formed by the reference line and the direction of the absorption axis of the polarizing film is $\emptyset_P$, an angle formed by the reference line and the direction of the slow axis of the retardation film on the polarizing film side is $\emptyset_{F1}$, and an angle formed by the reference line and the direction of the slow axis of the retardation film on the liquid crystal cell side is $\emptyset_{F2}$.

The aforementioned $Q_Z$ is a coefficient defined as:

$$Q_Z=(n_x-n_z)/(n_x-n_y)$$

where $n_x$, $n_y$ and $n_z$ are refractive indices of each retardation film in the directions of each axis of spatial coordinates (x, y, z) in which the z axis is a direction normal to the retardation film, the x and y axes are parallel to respectively the slow axis and the fast axis of each retardation film. $n_x$ is a refractive index in the direction of the slow axis and $n_y$ the fast axis of each retardation film.

According to the first construction, a bright normally-white reflective liquid crystal display device displaying achromatic black and white can be achieved.

In the case of the first construction, the angle $Ø_P$ formed by the reference line and the absorption axis of the polarizing film is preferably 90°~120° or 150°~180°. This preferable construction achieves even higher contrast and better display properties.

A reflective liquid crystal display device of a second construction of the present invention is based on the first construction and is featured by $Ø_P$ is –15°~105°, $Ø_P$-$Ø_{F1}$, –105°~–115°, and $Ø_P$-$Ø_{F2}$, –165°~–175°.

According to the second construction, a bright normally-white reflective liquid crystal display device, also displaying achromatic black and white can be achieved.

In the case of the second construction the angle $Ø_P$ formed by the reference line and the absorption axis of the polarizing film is preferably 0°~30° or 60°~90°. This preferable construction achieves even higher contrast and better display properties.

DETAILED DESCRIPTION OF THE INVENTION

The preferred embodiments of the present invention will now be described with reference to the accompanying drawings.

The First Preferred Embodiment

Figure 1:
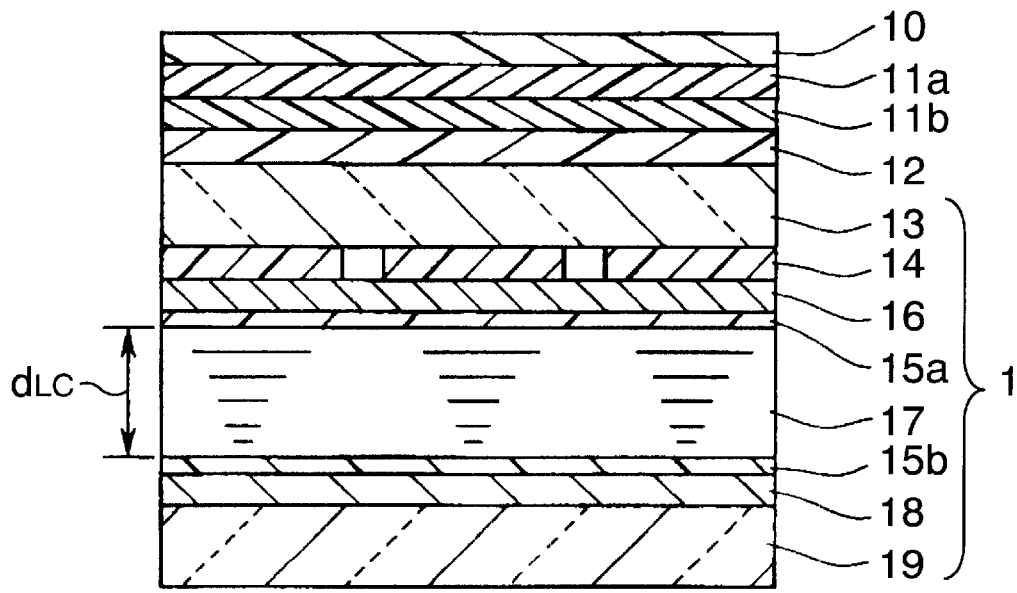
FIG. 1 is a cross-sectional view schematically showing the construction of a reflective LCD in accordance with a first preferred embodiment of the present invention.

FIG. 1 is a cross-sectional view schematically showing the reflective LCD in accordance with the first preferred embodiment. As shown in FIG. 1, the device in this embodiment includes a liquid crystal cell 1 sandwiched between an upper transparent substrate 13 and a lower substrate 19, and on top of the laminate, a scattering film 12, two retardation films 11a and 11b made with polycarbonate film, and a polarizing film 10 are disposed. On the inner face of the lower substrate 19, a metallic reflecting electrode 18 and an orientation layer 15b are layered, and on the inner surface of the upper transparent substrate, a color filter layer 14, a transparent electrode 16 and an orientation layer 15a are disposed. A liquid crystal layer 17 of a thickness of $d_{LC}$ is injected in between the two substrates to form the liquid crystal cell 1.

Figure 2:
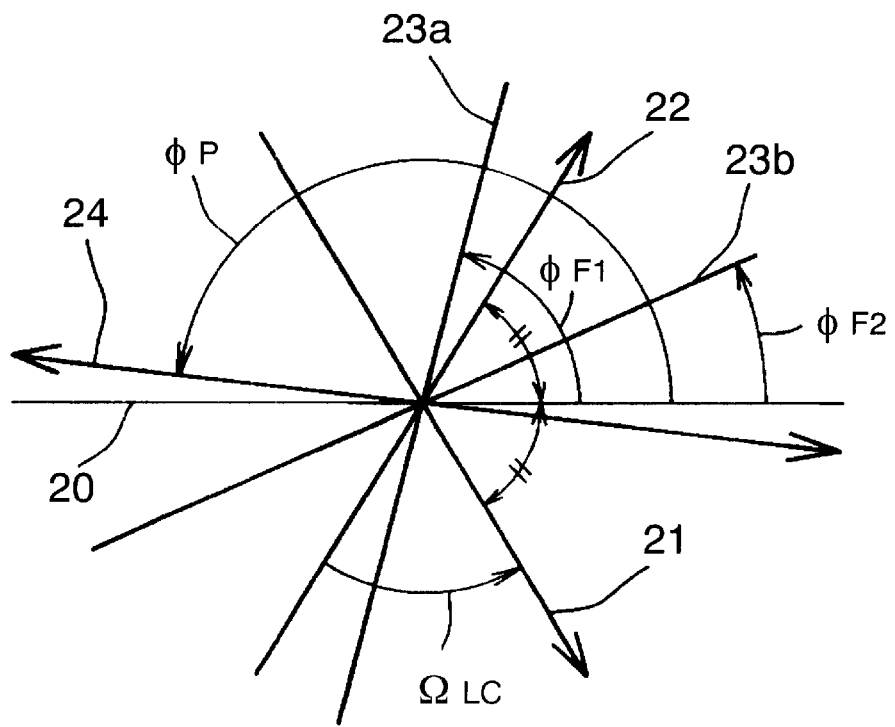
FIG. 2 is an optical schematic diagram of a reflective liquid crystal display device in accordance with preferred embodiments of the present invention.

FIG. 2 is an optical schematic diagram of a reflective LCD viewed from a direction normal to the plane in accordance with the first preferred embodiment. A direction, which bisects the larger of the angle formed by the orientation directions 21 and 22 of liquid crystal molecules respectively closest to the lower substrate and to the upper transparent substrate, is used as a reference line 20. FIG. 2 shows a direction 23a of the slow axis of the retardation film 11a disposed on the polarizing film side, a direction 23b of the slow axis of the retardation film 11b on the liquid crystal cell side, and a direction 24 of the absorption axis of the polarizing film. Angles $Ø_P$, $Ø_{F1}$ and $Ø_{F2}$ are the angles respectively of the direction 24 of the absorption axis of the polarizing film 10, the direction 23a of the slow axis of the retardation film 11a on the polarizing film side, and the direction 23b of the slow axis of the retardation film 11b on the liquid crystal cell side measured from the reference line 20. With respect to the sign of the angles, viewed from the upper transparent substrate side, the direction, $Ω_{LC}$, in which the liquid crystal molecules are twisted from the upper transparent substrate to the lower substrate, is defined as positive.

The upper transparent substrate 13 and the lower substrate 19 are made with non-alkali glass substrate (for example, product 1737 made by Corning Co.). On top of the upper transparent substrate 13 is the color filter layer 14 formed by the lithography method and which is a pigment-dispersion type with red, green, and blue being arranged in a strip-form. The transparent electrode 16 is a pixel electrode made with an indium tin oxide, formed on the color filter layer 14. The metallic reflecting electrode 18 of a specular reflection type is formed on top of the lower substrate 19 by vapor-depositing 300 nm-thick titanium, and 200 nm-thick aluminum thereupon.

A 5% by weight polyimide γ-butylolactone solution, is printed on the transparent electrode 16 and the metallic reflecting electrode 18, then cured at 250° C. Subsequently, in an orientating process, a twist of a predetermined angle is provided by a rotation rubbing method using a rayon cloth, to form the orientation layers 15*a* and 15*b*.

A thermosetting sealing resin (for example, Structbond made by Mitsui Toatsu Chemical. Co.) containing 1.0% by weight of glass fibers of a predetermined diameter is printed in the vicinity of the inner face of the upper transparent substrate 13. Resin beads of a predetermined diameter are dispersed at 100~200/mm² on the inner face of the lower substrate 19. The upper transparent substrate 13 and the lower substrate 19 are bonded together and the sealing resin is cured at 150° C. Subsequently, chiral liquid crystal is added to fluorine-ester nematic liquid crystal of the birefringence difference $\Delta n_{LC}=0.08$ in such a manner that the chiral pitch becomes 80 $\mu$m. The mixed liquid crystal is injected under vacuum in between the two substrates, and the opening is sealed with ultraviolet curing resin which is then cured by UV lights.

As the scattering film 12, isotropic front scattering film is layered on the upper transparent substrate 13 of the liquid crystal cell 1 formed in the foregoing manner. The retardation films 11*a* and 11*b* are layered on the scattering film 12 in such a way that their slow axes form an angle specified below. On top of these films, a neutral gray polarizing film (SQ-1852AP made by Sumitomo Chemical Industry Co.) undergone anti-glare (AG) and anti-reflection (AR) treatments, is attached as the polarization film 10 in such a manner that its absorption axis forms an angle specified below.

The retardation films include a film having positive uniaxial birefringence anisotropy in the direction inside the surface of the film, and a film having biaxial birefringence anisotropy in directions inside and perpendicular to the surface of the film. To show the level of the birefringence anisotropy in the direction perpendicular to the face, Z coefficient, $Q_z$ is used. $Q_z$ is a coefficient defined as:

$$Q_Z=(n_x-n_z)/(n_x-n_y)$$

where $n_x$, $n_y$ and $n_z$ are refractive indices in the directions of each axis of spatial coordinates (x, y, z) in which the z axis is a direction normal to the retardation films, and $n_x$ is a refractive index in the direction of the slow axis and $n_y$ the fast axis of the retardation film. In the case of uniaxial film $Q_Z=1$.

Under the standard condition of this embodiment, the thickness of the liquid crystal is set at $d_{LC}=3.0$ $\mu$m, $\Delta n_{LC} \cdot d_{LC}$, equal to 0.24 $\mu$m, and the twist angle of the liquid crystal, $\Delta_{LC}=63.0°$. As the two retardation films, films of $Q_Z=1.0$ are used. The retardation of the retardation film 11*a* on the polarizing film side is set as $R_{F1}=0.27$ $\mu$m whereas that of the retardation film 11*b* on the liquid crystal cell side is set as $R_{F2}=0.14$ $\mu$m. Angles of their slow axes against the absorption axis of the polarizing film are set as $\emptyset_P-\emptyset_{F1}=110.0°$ and $\emptyset_P-\emptyset_{F2}=170.0°$.

The optical properties of the device prepared based on the foregoing conditions are measured in a reflection mode by changing the angle $\emptyset_P$ of the absorption axis of the polarizing film. The result indicates that when $\emptyset_P$ is in the range of 75°~195°, a normally-white mode reflective LCD with a high contrast can be achieved. The reason for this is that when the absorption axis of the polarizing film is set at this angle, the luminance of black can be lowered.

When $\emptyset_P$ is in the range of 90°~120° or 150°~180°, a normally-white mode reflective LCD achieving a high contrast display of achromatic black and white can be obtained, thus it is especially preferable.

With regard to the properties measured by changing $\Delta n_{LC} \cdot d_{LC}$, when its value is in the range of 0.20 $\mu$m~0.30 $\mu$m, achromatic black low in reflectance and achromatic white high in reflectance are obtained.

The properties measured by changing the twist angle $\Delta_{LC}$ of the liquid crystal suggest that, in this embodiment, favorable properties are obtained when the twist angle $\Delta_{LC}$ is in the range of 45°~90°. Especially favorable properties are obtained when the twist angle $\Delta_{LC}$ is in the range of 60°~65°.

When the values of $\emptyset_P-\emptyset_{F1}$ and $\emptyset_P-\emptyset_{F2}$ are not in the aforementioned range, the contrast is lowered. Favorable ranges are 105°~115° for $\emptyset_P-\emptyset_{F1}$, and 165°~175° for $\emptyset_P-\emptyset_{F2}$. The value of the retardation of each retardation film has its favorable range; RF is 0.23~0.28 $\mu$m, and $R_{F2}$, 0.13~0.18 $\mu$m. In these ranges, favorable contrast can be achieved.

The optical properties measured when $\emptyset_P$ is set at 105.0° based on the foregoing conditions are described below. The measurement of the reflectance is conducted against a perfect diffuse light source.

Figure 3:
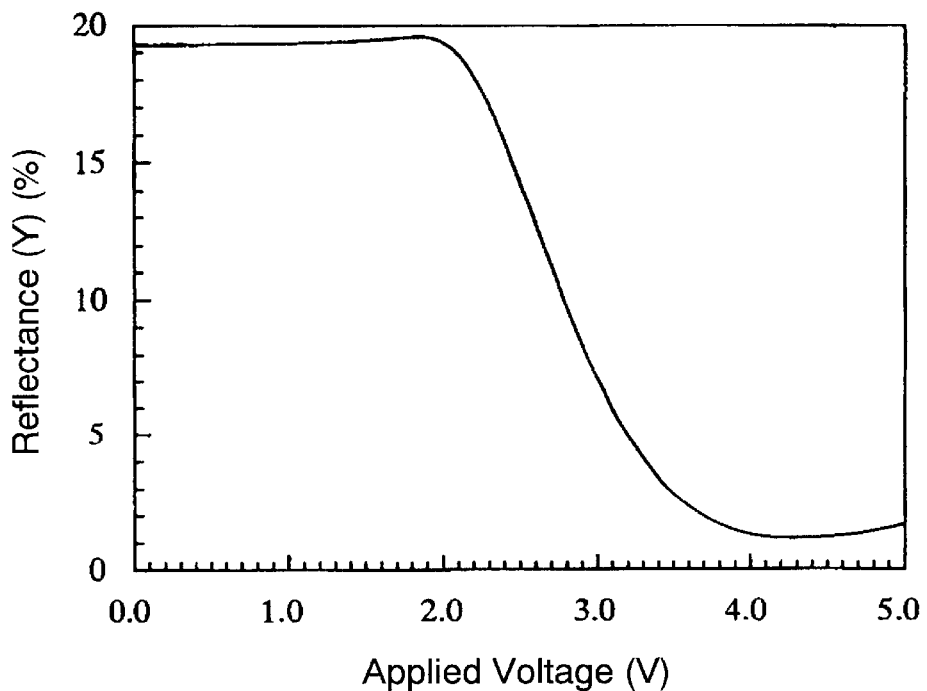
FIG. 3 is a graph showing a relationship between reflectance of the reflective liquid crystal display device and the applied voltages in accordance with the first preferred embodiment of the present invention.

FIG. 3 is a graph showing a relationship between reflectance of the reflective LCD and the applied voltages in accordance with the first preferred embodiment. Here the reflectivity is expressed in terms of Y-value in the XYZ colorimetric system as obtained by converting the brightness of white displayed on the liquid crystal display device relative to the reflectivity of a standard white panel being defined as 100%. As for the front properties (which are the properties measured from the direction normal to the display surface), the reflectance of white converted to a value of Y is 19.5%, and the contrast is 15.9. The reflectance changes from black to white achromatically, thus 64-gradation, full color display can be achieved.

When a reflective LCD is produced without the color filter layer 14 according to the foregoing construction, a contrast of 15.5 and the reflectance of white converted to a value of Y of 35.3% in terms of front properties can be achieved.

In the foregoing description, the scattering film 12 is sandwiched between the retardation film 11*b* and the upper transparent substrate 13, the same properties can be achieved when the scattering film 12 is disposed on top of the polarizing film 10, and when it is sandwiched between the retardation film 11*a* and 11*b*, the same properties can be achieved.

The Second Preferred Embodiment

Figure 4:
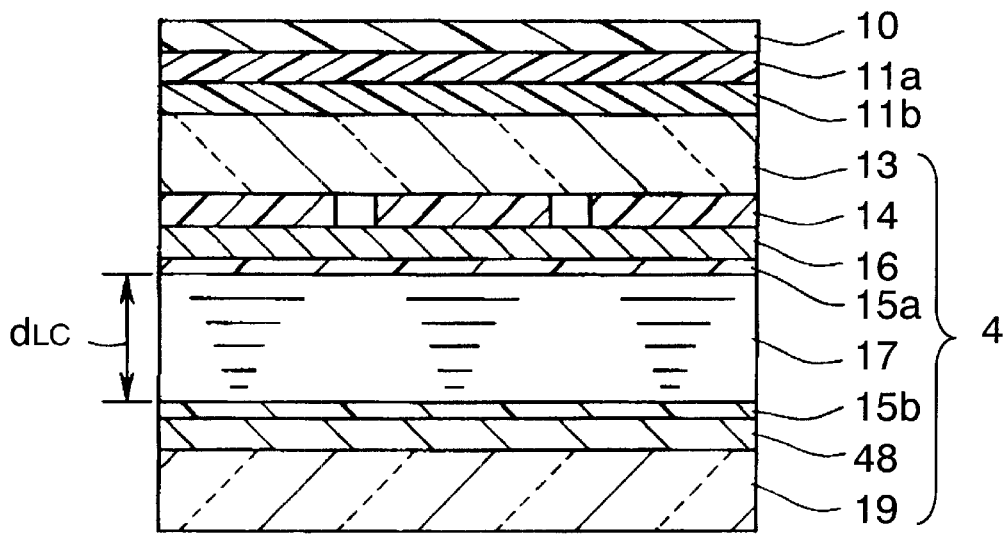
FIG. 4 is a cross-sectional view schematically showing the construction of a reflective liquid crystal display device in accordance with a second preferred embodiment of the present invention.

FIG. 4 is a cross section schematically showing the construction of a reflective LCD in accordance with the second preferred embodiment. The elements having the same functions as those of the first preferred embodiment shown in FIG. 1 are denoted by the same numerals. This embodiment differs from the first preferred embodiment in the following ways:

the scattering film 12 is not used; and instead of the metallic reflecting electrode 18 of a specular reflection type, a metallic reflection electrode 48 of a scatter reflection type is used.

The metallic reflection electrode 48 of a diffusion (scattering) reflection type is formed by vapor-depositing 300 nm-thick titanium and thereupon, 200 nm-thick aluminum on the lower substrate 19. The surface of the aluminum is made uneven so that it has angles of slopes 3°~12° on average. The rest of the manufacturing method of the display device is not explained here since it is the same as that of the first preferred embodiment.

The optical construction of this embodiment is the same as that of the first preferred embodiment, namely, the same as the optical construction of the reflective LCD shown in FIG. 2.

In this embodiment as well, the thickness of the liquid crystal is set at $d_{LC}=3.0\,\mu m$, $\Delta n_{LC} \cdot d_{LC}$, equal to $0.24\,\mu m$, and the twist angle of the liquid crystal, $\Delta_{LC}=63.0°$, as the standard condition. As the two retardation films, films of $Q_Z=1.0$ are used. The retardation of the retardation film 11a on the polarizing film side is set as $R_{F1}=0.27\,\mu m$ whereas that of the retardation film 11b on the liquid crystal cell side is set as $R_{F2}=0.14\,\mu m$. Angles of their slow axes against the absorption axis of the polarizing film are set as $Ø_P-Ø_{F1}110.0°$ and $Ø_P-Ø_{F2}170.0°$.

The optical properties of the device prepared based on the foregoing conditions are measured in a reflection mode by changing the angle $Ø_P$ of the absorption axis of the polarizing film. The result indicates that when $Ø_P$ is in the range of 75°~195°, a normally-white mode reflective LCD with a high contrast can be achieved. The reason for this is that when the absorption axis of the polarizing film is set at this angle, the luminance of black can be lowered.

When $Ø_P$ is in the range of 90°~120° or 150°~180°, a normally-white mode reflective liquid crystal display device with a high contrast display of achromatic black and white can be obtained, thus it is especially preferable.

With regard to the properties measured by changing $\Delta A_{LC} \cdot d_{LC}$, when its value is in the range of $0.20\,\mu m$~$0.30\,\mu m$., achromatic black low in reflectance and achromatic white high in reflectance are obtained.

The properties measured by changing the twist angle $\Delta_{LC}$ of the liquid crystal suggest that, in this embodiment, favorable properties are obtained when the twist angle $\Delta_{LC}$ is in the range of 45°~90°. Especially favorable properties are obtained when the twist angle $\Delta_{LC}$ is in the range of 60°~65°.

The following is the result obtained when the optical properties are measured by setting $Ø_P$ at 105.0° based on the foregoing conditions. The measurement is conducted against the perfect diffuse light source.

In terms of the front properties, the reflectance of white converted to a value of Y of 18.8%, and the contrast of 15.6 are achieved. The reflectance changes achromatically from black to white, thus, it is confirmed, a 64-gradation, full color display can be achieved.

When a reflective LCD is manufactured by removing the color filter layer 44, a contrast of 15.3, and the reflectance of white converted to a value of Y 34.1% in terms of front properties, are achieved.

The Third Preferred Embodiment

The manufacturing method and construction of the reflective LCD of the third preferred embodiment are the same as those of the first preferred embodiment, as such, the reflective LCD of this embodiment has the cross section shown in FIG. 1 and the optical construction of FIG. 2.

In this embodiment, the angles of the slow axes of the retardation films are set differently from the previous embodiments.

In this embodiment as well, under the standard condition, the thickness of the liquid crystal is set at $d_{LC}=3.0\,\mu m$, and $\Delta n_{LC} \cdot d_{LC}$, equal to $0.24\,\mu m$, and the twist angle of the liquid crystal, $\Omega_{LC}=63.0°$. As the two retardation films, films of $Q_Z=1.0$ are used. The retardation of the retardation film 11a on the polarizing film side is set as $R_{F1}=0.2\,\mu m$ whereas that of the retardation film 11b on the liquid crystal cell side is set as $R_{F2}=0.14\,\mu m$.

Angles of their slow axes of the retardation films against the absorption axis of the polarizing film are set as $Ø_P-Ø_{F1}=110.0°$ and $Ø_P-Ø_{F2}=-170.0°$.

The optical properties of the device prepared based on the foregoing conditions are measured in a reflection mode by changing the angle ØPof the absorption axis of the polarizing film. The result indicates that when $Ø_P$ is in the range of −15°~105°, a normally-white mode reflective LCD with a high contrast can be obtained. The reason for this is that when the absorption axis of the polarizing film is set at this angle, the luminance of black can be lowered.

When the values of $Ø_P-Ø_{F1}$ and $Ø_P-Ø_{F2}$ are not in the aforementioned range, the contrast is lowered. Favorable ranges are −105°~−115° for $Ø_P-Ø_{F1}$, and −165°~−175° for $Ø_P-Ø_{F2}$. The value of the retardation of the retardation film has its favorable range; $R_{F1}$ is 0.23~0.28 $\mu m$, and $R_{F2}$, 0.13~0.18 $\mu m$. In these ranges, favorable contrast can be achieved.

When $Ø_P$ is in the range of 0°~30° or 60°~90°, a normally-white mode reflective LCD with a high contrast display of achromatic black and white can be obtained, thus it is especially preferable.

With regard to the properties measured by changing $\Delta n_{LC} \cdot d_{LC}$, when its value is in the range of 0.20 $\mu m$~0.30 $\mu m$., achromatic black low in reflectance and achromatic white high in reflectance are obtained.

The properties measured by changing the twist angle $\Omega_{LC}$ of the liquid crystal suggest that, in this embodiment, when the twist angle $\Omega_{LC}$ is in the range of 45°~90° favorable properties are obtained. Especially favorable properties are obtained when the twist angle $\Omega_{LC}$ is in the range of 60°~65°.

The following is the result obtained when the optical properties are measured by setting $Ø_P$ at 75.0° based on the foregoing conditions. The measurement is conducted against the perfect diffuse light source.

Figure 5:
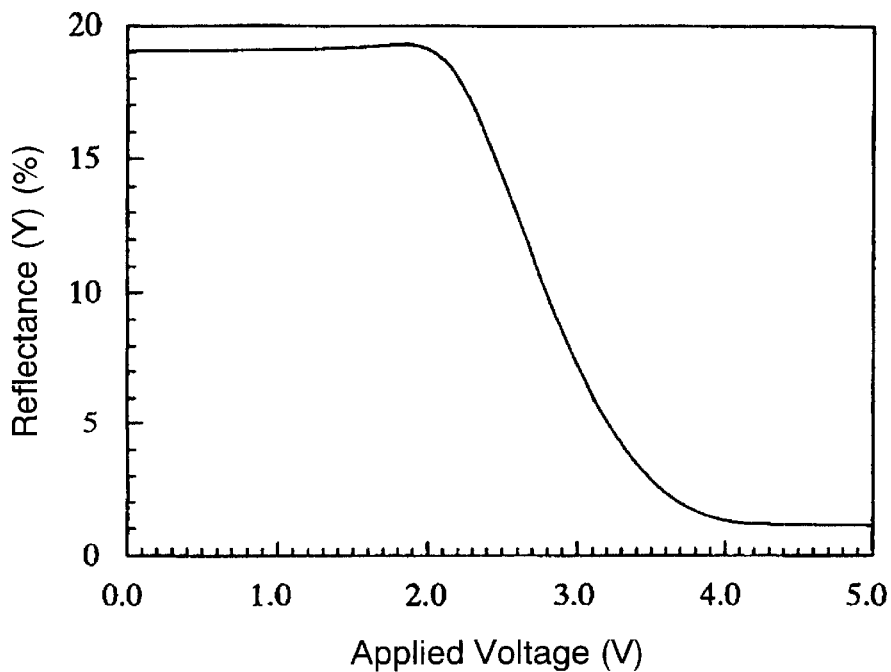
FIG. 5 is a graph showing a relationship between reflectance and the applied voltages of the reflective liquid crystal display device in accordance with a third preferred embodiment of the present invention.
Figure 6:
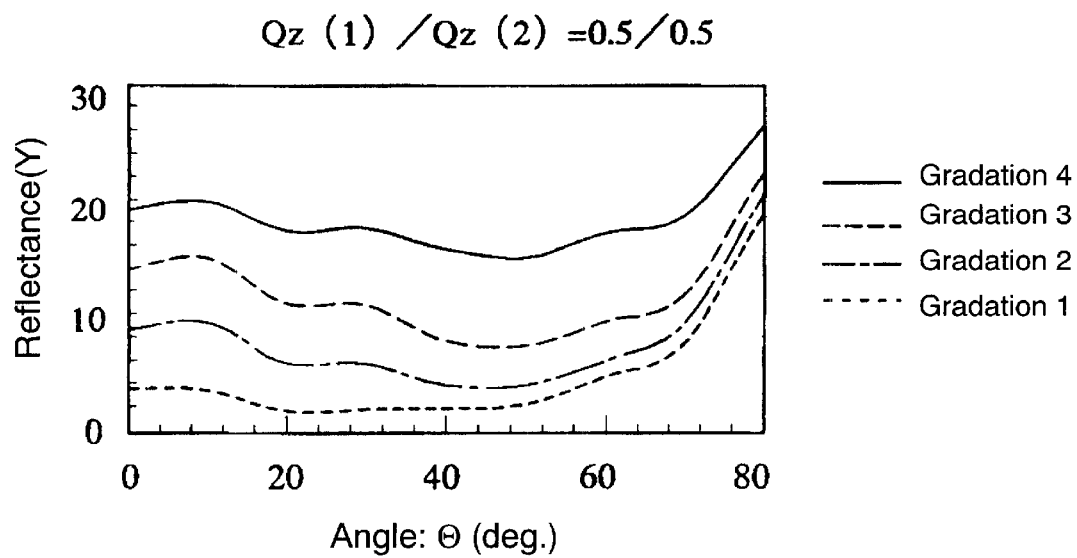
FIG. 6 is a graph showing the reflectance according to the shift in viewing angles in the right direction caused by the difference in Z coefficient.
Figure 7:
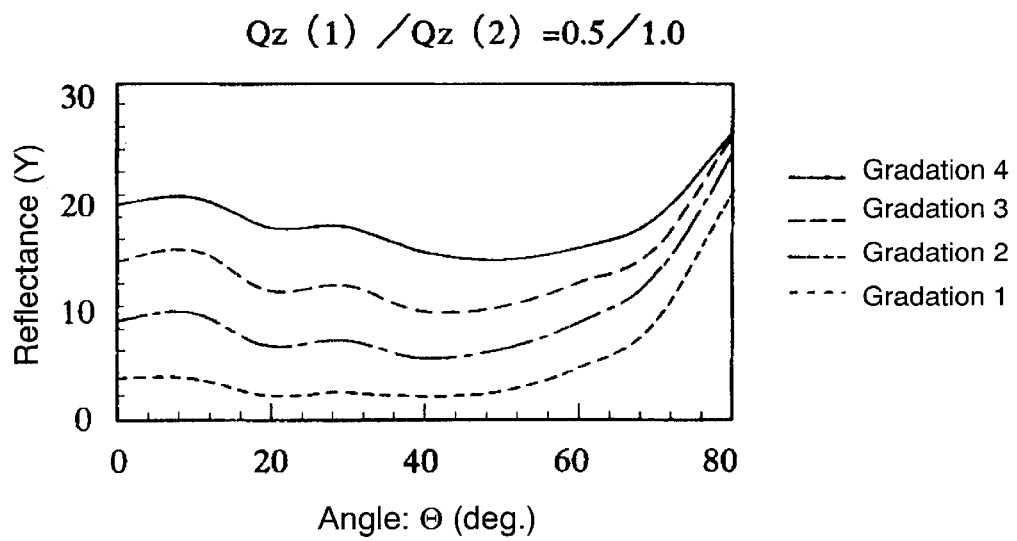
FIG. 7 is a graph showing the reflectance according to the shift in viewing angles in the right direction caused by the difference in Z coefficient.
Figure 8:
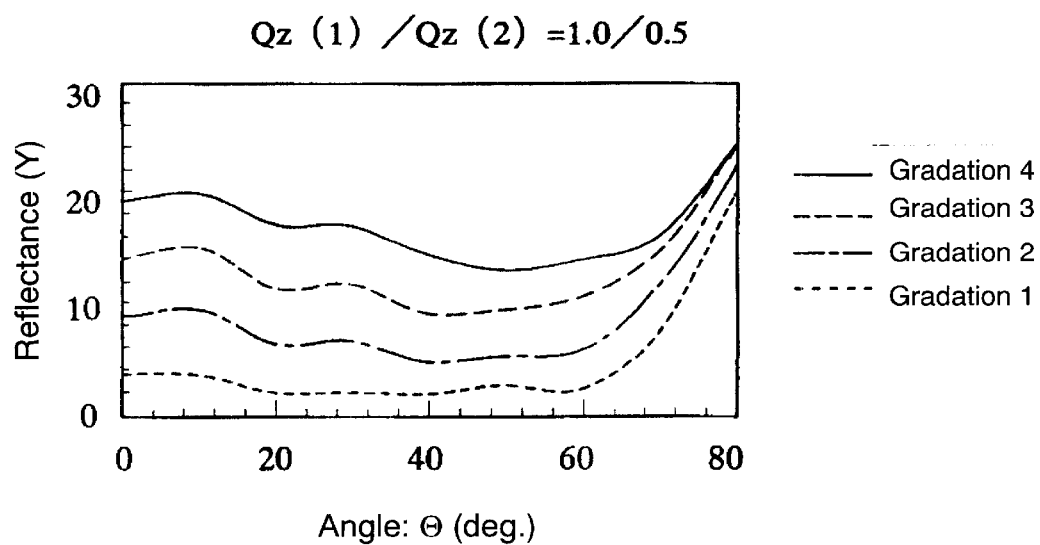
FIG. 8 is a graph showing the reflectance according to the shift in viewing angles in the right direction caused by the difference in Z coefficient.
Figure 9:
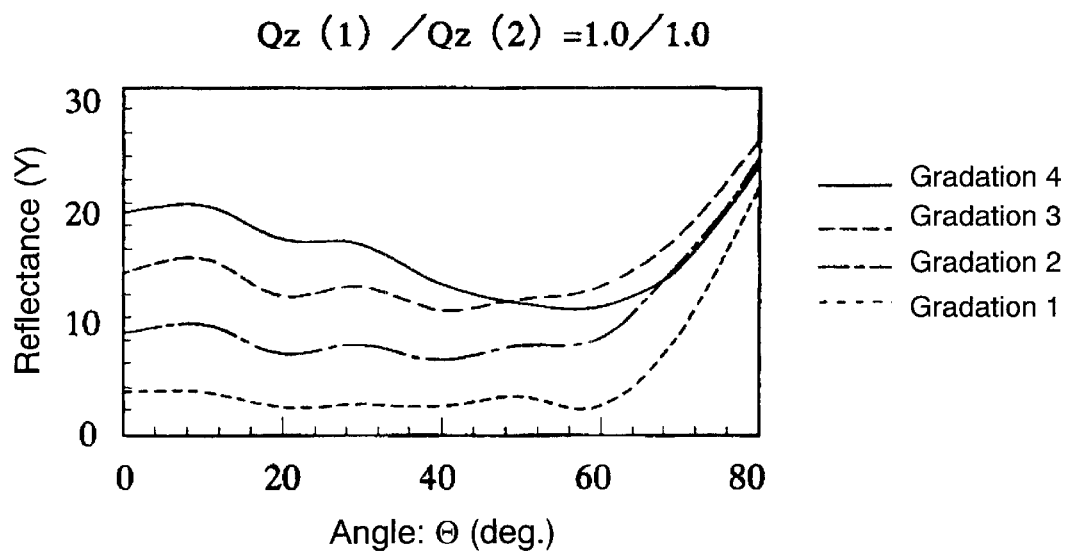
FIG. 9 is a graph showing the reflectance according to the shift in viewing angles in the right direction caused by the difference in Z coefficient.

FIG. 5 is a graph showing a relationship between reflectance and the applied voltages of the reflective LCD in accordance with the third preferred embodiment. As for the front properties, the reflectance of white converted to a value of Y is 19.3%, and the contrast is 15.8. The reflectance changes achromatically from black to white, thus it is confirmed that a 64-gradation, full color display can be achieved.

When a reflective LCD is manufactured without the color filter layer 14, contrast of 15.3, and the reflectance of white converted to a value of Y of 35.1% are achieved in terms of front properties.

In the foregoing description, the scattering film 12 is sandwiched between the retardation film 11b and the upper transparent substrate 13, however, the same properties can be achieved when the scattering film 12 is disposed on top of the polarizing film 10, or when it is sandwiched between the retardation film 11a and 11b.

The Fourth Preferred Embodiment

The manufacturing method and construction of the reflective LCD of the third preferred embodiment are the same as those of the first preferred embodiment, as such, the reflective LCD of this embodiment has the cross section shown in FIG. 1 and the optical construction of FIG. 2. In this embodiment, however, films of biaxial birefringence anisotropy, namely films having different Z coefficient, $Q_Z$ from those of the first preferred embodiment are used as the retardation films.

In this embodiment as well, under the standard condition, the thickness of the liquid crystal is $d_{LC}=3.0\,\mu m$, $\Delta n_{LC} \cdot d_{LC}$, equal to 0.24 $\mu m$, and the twist angle of the liquid crystal, $\Omega_{LC}=63.0°$. The retardation of the retardation film 11*a* on the polarizing film side is set as $R_{F1}$0.27 μm whereas that of the retardation film 11*b* on the liquid crystal cell side is set as $R_{F2}=0.14$ μm.

Angles of the slow axes of the retardation films against the absorption axis of the polarizing film are set as $\emptyset_P-\emptyset_{F1}=-110.0°$ and $\emptyset_P-\emptyset_{F2}=-170.0°$.

In this embodiment, the angle of the absorption axis of the polarizing film is fixed at $\emptyset_P=105.0°$. The optical properties of the device prepared based on the foregoing conditions are measured in a reflection mode by changing the Z coefficient, $Q_Z$ (1) of the retardation film 11*a* on the polarizing film side and the Z coefficient, $Q_Z$ (2) of the retardation film 11*b* on the liquid crystal cell side. The result suggests that when both $Q_Z$ (1) and $Q_Z$ (2) are 0.3~1.0, favorable properties with reduced changes in reflectance, contrast and color according to the different viewing angles can be achieved.

Changes in reflectance of four gradations from white to black when applying voltage, according to the viewing angles, are measured on four combinations of $Q_Z$ (1) and $Q_Z$ (2) being either 0.5 or 1.0.

FIGS. 6~9 are graphs in which changes in reflectance against the viewing angles shifting from the front (normal to the surface) of the panel (Θ=0) to the right in FIG. 2 by angle Θ, are plotted. In other words, FIGS. 6~9 show reflectance dependence on the viewing angle shifting to the right.

As shown in FIGS. 6~9, the smaller the Z coefficient, $Q_Z$ is, the better are the reflectance properties with a reduced dependency on viewing angles and no tone reversal. Favorably, $Q_Z$ (1) is in the range of 0.3~0.7. Further, it is confirmed that even better viewing angle properties can be achieved when both $Q_Z$ (1) and $Q_Z$ (2) are in the range of 0.3~0.7.

In the foregoing preferred embodiments, as reflecting electrodes, metallic reflecting electrodes composed of aluminum are used, however, the invention is not limited in this construction. For example, with a metallic reflecting electrode including silver as a component, similar results can be achieved.

The Fifth Preferred Embodiment

Figure 10:
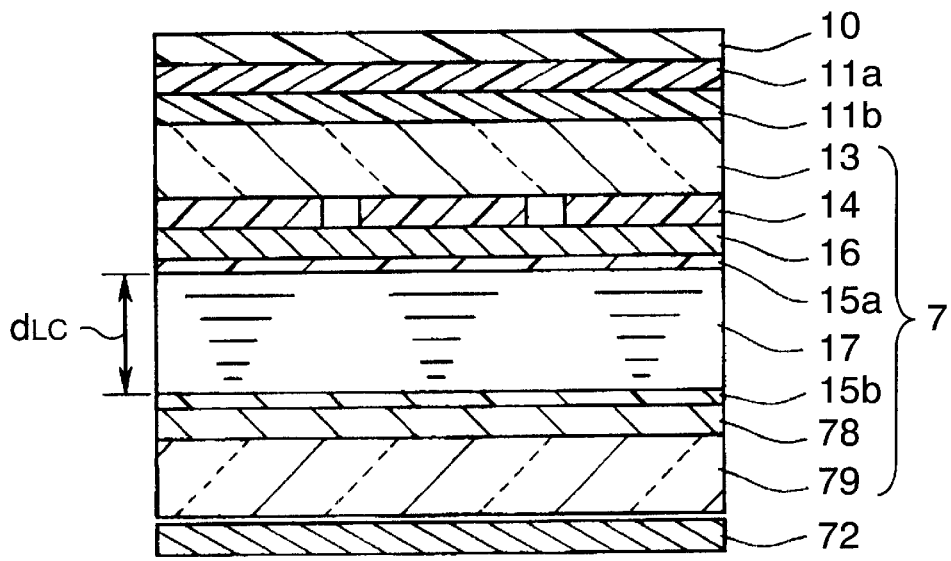
FIG. 10 is a cross-sectional view schematically showing the construction of a reflective liquid crystal display device in accordance with a fifth preferred embodiment of the present invention.

FIG. 10 is a cross section schematically showing the construction of a reflective LCD in accordance with the fifth preferred embodiment of the present invention. The construction of the display device of this embodiment is similar to the second preferred embodiment shown in FIG. 4, but with no scattering film. Differences from other embodiments include that the scattering type reflecting electrode 48 disposed on the inner surface of the lower substrate 19 is replaced with a transparent electrode 78, and reflection is performed by a scattering reflection plate 72 disposed outside of the liquid crystal cell. Due to this, a transparent substrate is used for a lower substrate 79. A silver scattering reflecting plate is used for the scattering reflection plate 72 disposed under the lower transparent substrate 79. Other components are the same as those of FIG. 4, thus the same elements are denoted with the corresponding numerals. <The manufacturing method of the reflective LCD is not explained here since it is the same as that of the first preferred embodiment.

The optical construction of the reflective LCD is the same as FIG. 2.

In this embodiment, the thickness of the liquid crystal is $d_{LC}=3.0$ μm, $\Delta n_{LC}\cdot d_{LC}$, equal to 0.24 μm, and the twist angle of the liquid crystal, $\Omega_{LC}=63.0°$. The angle of the absorption axis of the polarizing film is $\emptyset_P=105.0°$. As the two retardation films, films of $Q_Z=1.0$ are used. The retardation value of the retardation film 11*a* on the polarizing film side is set as $R_{F1}=0.27$ μm whereas that of the retardation film 11*b* on the liquid crystal cell side is set as $R_{F2}=0.14$ μm. Angles of the slow axes of the retardation films against the absorption axis of the polarizing film are set as $\emptyset_P-\emptyset_{F1}=110.0°$ and $\emptyset_P-\emptyset_{F2}=170.0°$. When upper and lower substrates are both composed of transparent substrates, and the scattering reflecting plate is used under the lower substrate, insignificant blurring of image is caused by differences in viewing angles, however, a reflective LCD enjoying natural changes in field of view properties can be achieved.

In terms of the front properties, the reflectance of white converted to a value of Y is 16.8%, and the contrast is 14.5.

Based on the forgoing construction, a reflective LCD is prepared without the color filter layer 73. In this case, as for the front properties, the reflectance of white converted to a value of Y being 33.6%, and the contrast, 14.1 are achieved.

If an air layer is provided in between the lower substrate and the reflecting plate 72 rather than completely bonding the scattering reflecting plate 72 with the lower transparent plate 79 with a glue, even more natural field of view properties can be achieved since the diffusion effect increases due to the difference in refractive index between resin (approximately 1.6) and air (1.0).

In this embodiment, a silver scattering reflecting plate is used, however, an aluminum scattering reflecting plate can also achieve similar effects in. the invention.

The Sixth Preferred Embodiment

Figure 11:
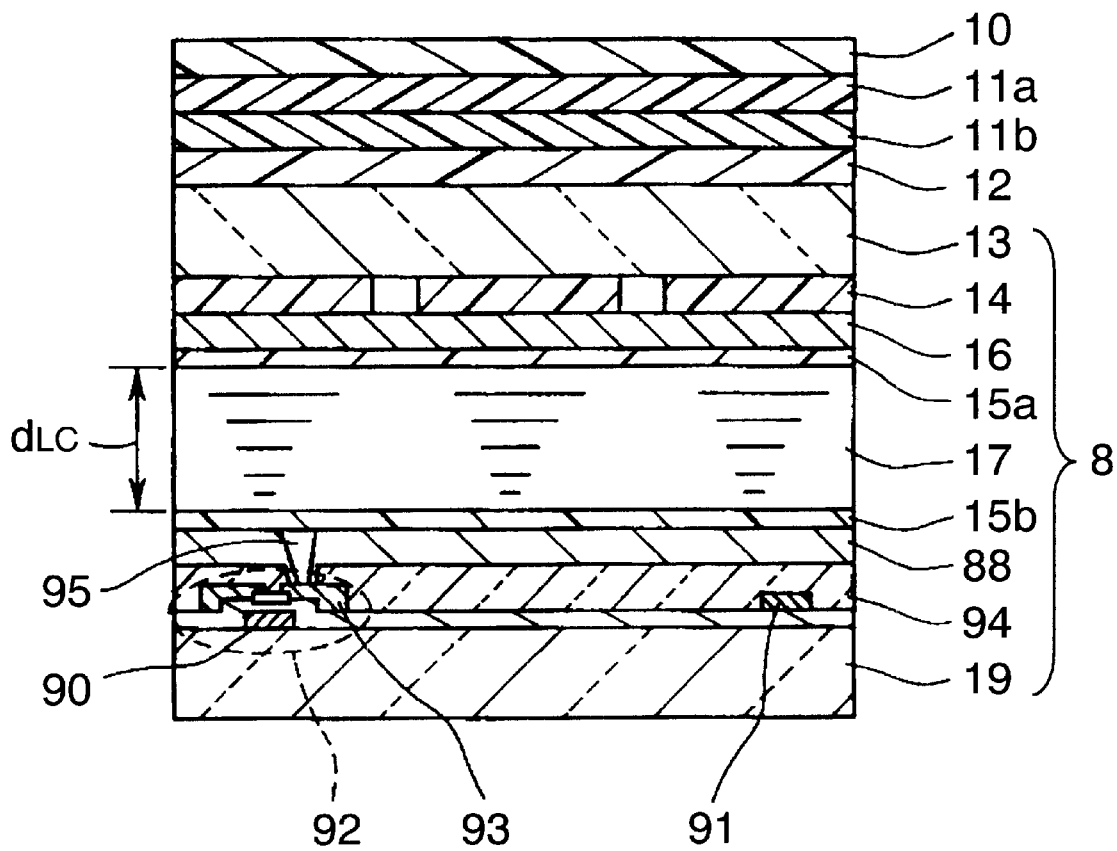
FIG. 11 is a cross-sectional view schematically showing the construction of a reflective liquid crystal display device in accordance with a sixth preferred embodiment of the present invention.

FIG. 11 is a cross section schematically showing the construction of a reflective LCD in accordance with the sixth preferred embodiment. The elements having the same function as the first preferred embodiment described in FIG. 1, are denoted with the same numerals.

In this embodiment, a gate electrode 90, a source wire 91, a thin film transistor device (TFT) 92, a drain electrode 93 and a flattening film 94 are disposed on the lower substrate 19 forming a so called active matrix array. A metallic reflecting electrode 88 is interconnected with the nonlinear switching device (TFT) 92 under the flattening film 94 via a contact hole 95. The metallic reflecting electrode 88 is structured such that each pixel is independently separated, therefore each pixel is actively driven by independent signals, thus a high-contrast, high quality display free of cross talk can be achieved.

The optical construction of the reflective LCD of this embodiment is the same as FIG. 2.

The upper transparent substrate 13 and the lower substrate 19 are made with non-alkali glass substrate (for example, product 1737 made by Corning Co.). On top of the upper transparent substrate 13 is the color filter layer 14, and on top of which is an counter electrode made with an indium tin oxide, formed on the color filter layer 14 as the transparent electrode. 16.

The gate electrode 90 made with aluminum and tantalum, the source electrode 91 made with titanium and aluminum, and the drain electrode 93 are arranged in a matrix form. At each intersection of the gate electrode 90 and the source electrode 91, a TFT device 92 composed of amorphous silicon is formed.

Over the entire surface of the lower substrate 19 on which nonlinear devices are formed, a positive photosensitive acrylic resin (for example, FVR made by Fuji Drag Industry Co.) is coated and the flattering film 94 is formed. Subsequently, using a predetermined photo mask, UV lights are irradiated to form the contact hole 95 on the drain electrode 93. The metallic reflecting electrode 88 of a specular reflection type is then disposed thereupon by vapor-depositing 300 nm-thick titanium and, on top of titanium, 200 nm-thick aluminum.

A 5% by weight polyimide y-butyrolactone solution, is printed on the transparent electrode 16 and the metallic reflecting electrode 88, then cured at 250° C. Subsequently, in an orientating process, a twist of a predetermined angle is provided by a rotation rubbing method using a rayon cloth, to form the orientation layers 15a and 15b.

The upper transparent substrate 13 and the lower substrate 19 are bonded together in a similar method to that of the first preferred embodiment, and the sealing resin is cured at 150° C. Subsequently, a mixture of fluorine-ester nematic liquid crystal of the birefringence difference $\Delta n_{LC}$=0.08 to which a predetermined amount of chiral liquid crystal is added, is injected under vacuum in between the two substrates, and the opening is sealed with ultraviolet curing resin which is then cured by UV lights.

As the scattering film 12, isotropic front scattering film is disposed on the upper transparent substrate 13 of the liquid crystal cell 8 formed in the foregoing manner. The retardation films 11a and 11b are disposed on the scattering film 12 in such a manner that their slow axes form an angle specified below. On top of these films, the polarization film 10 is disposed in such a manner that its absorption or transmittance axis forms an angle specified below.

In this embodiment, the thickness of the liquid crystal is $d_{LC}$=3.0 μm, and $\Delta n_{LC} \cdot d_{LC}$, equal to 0.24 μm, and the twist angle of the liquid crystal, $\Omega_{LC}$=63.0°. As the two retardation films, films of $Q_Z$=1.0 are used. The retardation value of the retardation film 11a on the polarizing film side is set as $R_{F1}$=0.27 μm whereas that of the retardation film 11b on the liquid crystal cell side is set as $R_{F2}$=0.14 m. The angle of the absorption axis of the polarizing film is $\emptyset_P$=105.0°. Angles of the slow axes of the retardation films against the absorption axis of the polarizing film are set as $\emptyset_P - \emptyset_{F1}$=110.09 and $\emptyset_P - \emptyset_{F2}$=170.0°.

The reflective LCD constructed in the foregoing manner achieves a 64-gradation, full color display when driven actively. Since the aperture ratio of the pixel is as large as 97% thanks to a metallic electrode formed on the flattened film, contrast of 15.7, and the reflectance of white converted to a value of Y 19.1% in terms of front properties can be achieved.

In all the other embodiments mentioned so far as well, an active-drive reflective LCD can be achieved based on this embodiment by forming a non-linear switching device such as TFT on the lower substrate. As a non-linear switching device, not only amorphous silicon TFT but also two terminal device such as MIM and thin film diode, and poly-silicon TFT can be used alternatively for the same effect.

Polycarbonate is used as a retardation film for all the embodiments. This is because, at present, it is preferable in terms of cost and optical properties. However, the present invention is not limited to this, and any material which has the same optical anisotropy can be used as a retardation film.

INDUSTRIAL APPLICABILITY

As thus far described, according to the present invention, a normally-white reflective liquid crystal display device capable of achromatic black and white display, and bright and high contrast multi-gradation and multi-color display can be achieved.

Thus, it is possible to provide a liquid crystal display device which achieves high power efficiency and a high picture quality, thereby promoting the use of liquid crystal display devices in a wide range of areas including mobile information devices.

What is claimed is:

1. A reflective liquid crystal display device comprising;
   a) a liquid crystal cell formed by injecting a nematic liquid crystal in between a first and a second substrates;
   b) a polarizing film disposed on the first substrate of said liquid crystal cell;
   c) two retardation films disposed in between said polarizing film and said liquid crystal cell; and
   d) a light reflecting means disposed on the second substrate,
   wherein a twist angle of said nematic liquid crystal $\Omega_{LC}$ is 45°~90°, a product $\Delta n_{LC} \cdot d_{LC}$ is 0.20 μm~0.30 μm where $\Delta n_{LC}$ and $d_{LC}$ are respectively birefringence of said nematic liquid crystal and thickness of a liquid crystal layer, a retardation value of said retardation film on said polarizing film side $R_{F1}$ is 0.13 μm~0.18 μm, a retardation value of said retardation film on said liquid crystal cell side $R_{F2}$ is 0.13 μm~0.18 μm, and the Z coefficient, $Q_Z$ of each of said two retardation films is 0.3~1.0,
   wherein when a bisector of a larger angle between angles which are formed by orientation directions respectively of liquid crystal molecules closest to said first substrate and liquid crystal molecules closest to said second substrate is set as a reference line inside the substrates, and when a direction, in which said nematic liquid crystal is twisted viewed from the first substrate to the second substrate, is positive,
   $\emptyset_P$ is 75°~195°, $\emptyset_P - \emptyset_{F1}$, 105°~115°, and $\emptyset_P - \emptyset_{F2}$, 165°~175°,
   where $\emptyset_P$ is an angle formed by the reference line and a direction of an absorption axis of said polarizing film, $\emptyset_{F1}$ is an angle formed by the reference line and a direction of a slow axis of said retardation film on said polarizing film side, and $\emptyset_{F2}$ is an angle formed by the reference line and a direction of a slow axis of said retardation film on said liquid crystal cell side, and the aforementioned $Q_Z$ is a coefficient defined as $$Q_Z = (n_x - n_z)/(n_x - n_y),$$

where $n_x$, $n_y$ and $n_z$ are refractive indices of each retardation film in directions of each axis in spatial coordinates x, y and z in which the z axis is a direction normal to surfaces of the retardation film, and $n_x$ is a refractive index in a direction of the slow axis and $n_y$ an fast axis of the retardation film.

2. The reflective liquid crystal display device of claim 1, wherein the angle $\emptyset_P$, formed by the reference line and the absorption axis of said polarizing film, is one of 90°~120° and 150°~180°.

3. A reflective liquid crystal display device comprising;
   a) a liquid crystal cell formed by injecting a nematic liquid crystal in between a first and a second substrates;
   b) a polarizing film disposed on said first substrate of said liquid crystal cell;
   c) two retardation films disposed in between said polarizing film and said liquid crystal cell; and
   d) a light reflecting means disposed on said second substrate,
   wherein a twist angle of said nematic liquid crystal $\Omega_{LC}$ is 45°~90°, a product $\Delta n_{LC} \cdot d_{LC}$ is 0.20 μm~0.30 μm where $\Delta n_{LC}$ and $d_{LC}$ are respectively birefringence of said nematic liquid crystal and thickness of a liquid crystal layer, a retardation value of said retardation film on said polarizing film side $R_{F1}$ is 0.13 µm~0.18 µm, a retardation value of said retardation film on said liquid crystal cell side $R_{F2}$ is 0.13 µm~0.18 µm, and the Z coefficient, $Q_Z$ of each of said two retardation film is 0.3~1.0, wherein when a bisector of a larger of the angle formed by an orientation direction of liquid crystal molecules closest to said first substrate and an orientation direction of liquid crystal molecules closest to said second substrate is set as a reference line, and when a direction, in which said nematic liquid crystal is twisted from said first substrate to said second substrate, viewed from the side of said first substrate, is defined positive, $\varnothing_P$ is −15°~105°, $\varnothing_P - \varnothing_{F1}$, −105°~−115°, and $\varnothing_P - \varnothing_{F2}$, −165°~−175°, where $\varnothing_P$ is an angle formed by the reference line and a direction of an absorption axis of said polarizing film, $\varnothing_{F1}$ is an angle formed by the reference line and a direction of a slow axis of said retardation film on said polarizing film side, and $\varnothing_{F2}$ is an angle formed by the reference line and a direction of a slow axis of said retardation film on said liquid crystal cell side, and the aforementioned $Q_Z$ is a coefficient defined as $$Q_Z = (n_x - n_z)/(n_x - n_y),$$

where $n_x$, $n_y$ and $n_z$ are refractive index of each retardation film in directions of each axis in spatial coordinates x, y and z in which the z axis is a direction normal to surfaces of the retardation films, and $n_x$ is a refractive index in a direction of the slow axis and $n_y$ an fast axis of the retardation film.

4. The reflective liquid crystal display device of claim 3, wherein the angle $\varnothing_P$, formed by the reference line and the absorption axis of said polarizing film is one of 0°~30° and 60°~90°.

5. The reflective liquid crystal display device of one of claims 1~4, wherein the twist angle $\Omega_{LC}$ of said nematic liquid crystal is 60°~65°.

6. The reflective liquid crystal display device of one of claims 1~4, wherein the Z coefficient, $Q_Z$ of said retardation film on said polarizing film side is 0.3~0.7.

7. The reflective liquid crystal display device of one of claims 1~4, wherein the Z coefficient, $Q_Z$ of each of said two retardation films is 0.3~0.7.

8. The reflective liquid crystal display device of one of claims 1~4, further comprising a scattering film on said first substrate.

9. The reflective liquid crystal display device of claim 8, wherein said scattering film is disposed in between said retardation films and the substrate.

10. The reflective liquid crystal display device of claim 8, wherein said scattering film is a front scattering film.

11. The reflective liquid crystal display device of one of claims 1~4, wherein said light reflecting means is a metallic electrode including at least one of aluminum and silver as a component.

12. The reflective liquid crystal display device of claim 11, wherein said metallic electrode has a mirror-like surface.

13. The reflective liquid crystal display device of claim 11, wherein a scattering film is disposed on said metallic electrode.

14. The reflective liquid crystal display device of claim 11, wherein said metallic electrode has an uneven surface with angles of slopes being 3°~12° on average.

15. The reflective liquid crystal display device of one of claims 1~4, wherein said second substrate is a transparent substrate, and on outer surface of which said light reflecting means is disposed.

16. The reflective liquid crystal display device of one of claim 15, wherein a layer of air is provided between said transparent substrate and said light reflecting means.

17. The reflective liquid crystal display device of one of claims 1~4, wherein a color filter is disposed on one of the substrates.

18. The reflective liquid crystal display device of one of claims 1~4, wherein a nonlinear switching device is disposed on said second substrate.

19. The reflective liquid crystal display device of claim 18, wherein a insulative flattened film is formed on said nonlinear device, and through a contact hole formed on said flattened film, said nonlinear switching device and an electrode on said second substrate side are interconnected.

20. The reflective liquid crystal display device of one of claims 1~4, wherein said retardation films are made with polycarbonate.

* * * * *